(12) United States Patent
Zhang et al.

(10) Patent No.: US 11,799,386 B2
(45) Date of Patent: Oct. 24, 2023

(54) ISOLATED POWER CONVERTER AND DATA TRANSMISSION METHOD

(71) Applicant: Silergy Semiconductor Technology (Hangzhou) LTD, Hangzhou (CN)

(72) Inventors: Qiao Zhang, Hangzhou (CN); Xinlei Li, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 63 days.

(21) Appl. No.: 17/370,156

(22) Filed: Jul. 8, 2021

(65) Prior Publication Data

US 2022/0038017 A1 Feb. 3, 2022

(30) Foreign Application Priority Data

Aug. 3, 2020 (CN) .......................... 202010765730.6

(51) Int. Cl.
*H02M 3/335* (2006.01)

(52) U.S. Cl.
CPC .............................. *H02M 3/33592* (2013.01)

(58) Field of Classification Search
None
See application file for complete search history.

(56) References Cited

U.S. PATENT DOCUMENTS

| | | | |
|---|---|---|---|
| 6,075,716 A | 6/2000 | He et al. | |
| 6,385,057 B1 | 5/2002 | Barron | |
| 8,471,488 B1 | 6/2013 | Hopkins et al. | |
| 8,774,254 B2 * | 7/2014 | Yang | H02M 3/33523 363/21.15 |
| 9,077,260 B2 | 7/2015 | Zhao et al. | |
| 9,124,169 B2 | 9/2015 | Garlow et al. | |
| 9,525,336 B2 | 12/2016 | Huang | |
| 10,090,750 B1 | 10/2018 | Wong et al. | |
| 10,687,404 B2 * | 6/2020 | Abbo | H01F 38/14 |
| 10,958,106 B2 * | 3/2021 | Matsuda | H02J 50/80 |
| 2009/0243398 A1 | 10/2009 | Yohanan et al. | |
| 2015/0207398 A1 | 7/2015 | Proca | |
| 2015/0216007 A1 | 7/2015 | Ferrara et al. | |
| 2017/0250612 A1 * | 8/2017 | Malinin | H02M 3/33507 |
| 2018/0091040 A1 | 3/2018 | Wong et al. | |
| 2018/0331615 A1 | 11/2018 | Yang et al. | |
| 2021/0135586 A1 * | 5/2021 | Ha | H02M 3/01 |

FOREIGN PATENT DOCUMENTS

CN 105119505 A 12/2015

\* cited by examiner

*Primary Examiner* — Jeffrey A Gblende

(57) ABSTRACT

An isolated power converter can include: a primary side having a primary winding and a primary power transistor; a secondary side having a secondary winding and a secondary power transistor; a secondary control circuit configured to change a voltage across the secondary winding to change a voltage across the primary winding during a period when both the primary power transistor and the secondary power transistor are in a turn-off state; and a primary control circuit configured to control switching states of the primary power transistor, such that an output signal of the isolated power converter matches an output demand.

15 Claims, 5 Drawing Sheets

ISOLATED POWER CONVERTER AND DATA TRANSMISSION METHOD

RELATED APPLICATIONS

This application claims the benefit of Chinese Patent Application No. 202010765730.6, filed on Aug. 3, 2020, which is incorporated herein by reference in its entirety.

FIELD OF THE INVENTION

The present invention generally relates to the field of power electronics, and more particularly to isolated power converters and data transmission methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Isolated power converters provide regulated power to electronic devices, while also providing electrical isolation between the electronic devices and AC power. In a power delivery (PD) adapter application, in order to improve the charging power, the output signal (voltage or current, etc.) can change according to electronic device information. Example control methods may generally include: secondary chip control and primary chip control. In secondary chip control, the secondary chip communicates with the electronic device via a port to obtain an output reference voltage. Then, the secondary chip can detect the output signal, and compare the output signal against the output reference voltage, and transmits control information to a primary chip through an optocoupler after compensating by a compensation circuit. The primary chip can control the switch and adjust the state of the circuit.

In primary chip control, the secondary chip communicates with the electronic device via the port to obtain the output reference voltage, and then transmits the output reference voltage to the primary chip through the optocoupler. The primary chip can detect the output signal by the auxiliary winding, compare the output signal against the output reference voltage, and then control the switch and adjusts the state of the circuit after compensating. In the above two control approaches, because the control information is transmitted to the primary chip via the optocoupler, and an auxiliary winding is utilized for voltage sampling, the system circuit is relatively complex, and as a result it is difficult to reduce costs and circuit volume.

Figure 1:
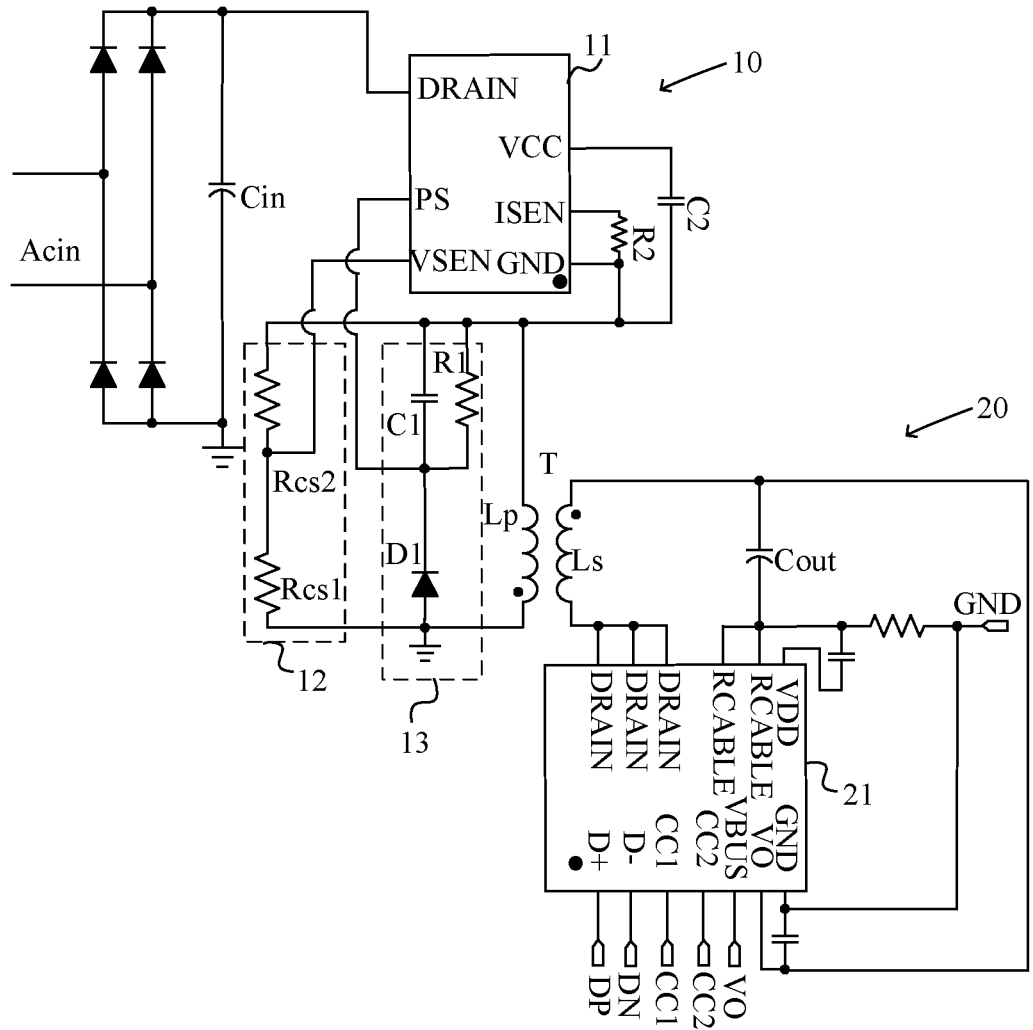
FIG. 1 is a schematic block diagram of an example isolated power converter, in accordance with embodiments of the present invention.

Referring now to FIG. 1, shown is a schematic block diagram of an example isolated power converter, in accordance with embodiments of the present invention. In this particular example, the isolated power converter is a flyback topology. The power stage circuit of the isolated power converter can include primary winding Lp and primary power transistor S1 (e.g., integrated in primary chip 11 of primary side 10) connected in series between voltage input pin Vin and the ground. Also, secondary winding Ls can be coupled with primary winding Lp, and secondary power transistor S2 can connect in series with secondary winding Ls (e.g., integrated in secondary chip 21 of secondary side 20). It should be understood that a primary control circuit can be integrated in primary chip 11, and a secondary control circuit may be integrated in secondary chip 21.

The isolated power converter also can include sampling circuit 12, which can connect in parallel between two terminals of primary winding Lp. Sampling circuit 12 may obtain sampling voltage $V_{SEN}$ that represents a voltage on primary winding Lp. Sampling circuit 12 can obtain output voltage information of the power stage circuit, a zero-crossing time of the current flowing through secondary winding Ls, as well as current valley time information. Therefore, by sampling the voltage across the two terminals of primary winding Lp after voltage division, the above information can be obtained and primary power transistor S1 can be controlled based on this information, in order to adjust the output signal of the isolated power converter. It should be understood that particular embodiments may be suitable to any power stage topology.

In addition, secondary side 20 of the power converter can connect to the electronic device. In order to increase the charging power, the output signal (e.g., voltage or current, etc.) of the isolated power converter can be adjusted accordingly according to the electronic device information. Based on this, secondary chip 21 may receive data from the electronic device via corresponding interfaces, and can transmit the data received by the secondary side to the primary side through a certain information transmission method, such that the primary side can switch operations to adapt, thereby generating the output signal that matches the data. In particular embodiments, the reference voltage of the electronic device can be transmitted from secondary side 20 to primary side 10. This information transmission path can also be used to provide data including other information to primary side chip 11 of primary side 10, such as information that determines which specific electronic device is connected to the power source, and the operating characteristics of the connected electronic device, such as operating voltage level, current level, and/or operating mode (e.g., off mode, sleep mode, hibernation mode, etc.).

In particular embodiments, the power stage circuit of the isolated power converter may adopt a dual winding structure, which is a transformer structure without auxiliary winding. Ground pin GND of primary chip 11 can connect to the upper terminal (e.g., non-dotted terminal) of primary winding Lp, and the lower terminal (e.g., dotted terminal) of primary winding Lp can connect to one terminal of the input capacitor Cin that is grounded. Sampling circuit 12 can connect between two terminals of primary winding Lp, and may include a resistor divider circuit. The resistor divider circuit can include detection resistors RCS1 and RCS2 connected in series. Two terminals (e.g., not connected in common) of detection resistors RCS1 and RCS2 may respectively be connected to the two terminals of primary winding Lp, and sampling voltage $V_{SEN}$ can be generated at a common node of detection resistors RCS1 and RCS2. The isolated power converter may also be provided with RCD absorption circuit 13 in primary side 10. RCD absorption circuit 13 can connect between two terminals of primary winding Lp, and primary chip 11 may be supplied with power through absorption capacitor C1 in RCD absorption circuit 13.

Optionally, the upper terminal of absorption capacitor C1 in RCD absorption circuit 13 can connect to the upper terminal of primary winding Lp, and the lower terminal of absorption capacitor C1 can connect to pin PS of primary chip 11. Capacitor C2 connected to pin VCC of primary chip 11 may be charged through the LDO circuit integrated in primary chip 11, thereby supplying power to primary chip 11. The primary winding Lp can be coupled with secondary winding Ls. In order to simplify the circuit design, the lower terminal (e.g., non-dotted terminal) of secondary winding Ls can connect to pin DRAIN of secondary chip 21, and the upper terminal (e.g., dotted terminal) of secondary winding Ls can connect to the positive electrode of output capacitor Cout. Pin Rcable of secondary chip 21 can connect to the negative electrode of output capacitor Cout that is grounded.

In particular embodiments, an isolated power converter and a data transmission method may be provided. That is, during the period when the primary power transistor and the secondary power transistor are both in the off state, the secondary power transistor can be controlled to be turned on in different periods of time, such that different types of data on secondary side 20 can be transmitted to primary side 10 through transformer T including primary winding Lp and secondary winding Ls. Here, the period when the primary power transistor and the secondary power transistor are both in the off state may refer to the period during which the pulse-width modulation (PWM) control signal of the primary power transistor is in the inactive state during a switching period. The period may extend from the moment when the secondary power transistor is turned off to the moment when the primary power transistor starts to be turned on again in the next switching period.

For example, secondary chip 21 can communicate with the electronic device via preset pins to obtain its output reference voltage, and can encode the output reference voltage into corresponding data. According to the type of the data to be transmitted (e.g., 0 or 1), the secondary power transistor can be controlled to be turned on at least once during different time periods, and to maintain the on state for first time T1, thereby changing the voltage across primary winding Lp by changing the voltage across secondary winding Ls. As such, different types of data on secondary side 20 can be transmitted to primary side 10 through transformer T, and the corresponding type of data can be transmitted to the primary side.

For example, the different time periods can be divided according to the voltage across the two power terminals of the secondary power transistor; that is, the drain-source voltage of the secondary power transistor, e.g., according to the voltage of pin DRAIN of secondary chip 21. It should be understood that the voltages of multiple nodes in the circuit can represent different operating processes and states of the circuit. Here, the voltage across the two power terminals of the secondary power transistor can be utilized. In other applications, the voltages of other terminals can be sampled to divide different time periods. For example, the voltage across the two power terminals of the primary power transistor or the voltage of primary winding Lp can be selected to divide the different time periods.

Figure 2:
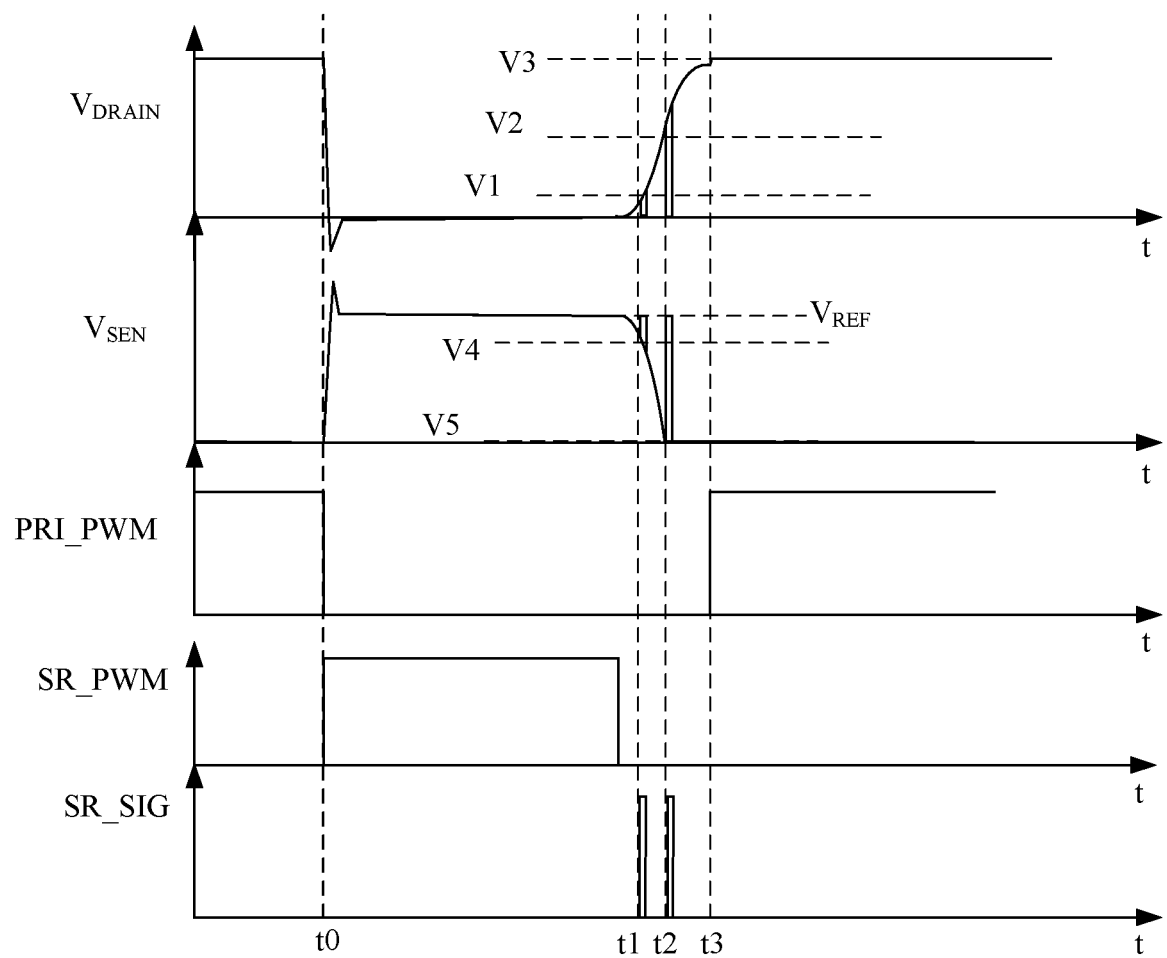
FIG. 2 is a waveform diagram of example operation of an isolated power converter, in accordance with embodiments of the present invention.

Referring now to FIG. 2, shown is a waveform diagram of example operation of the isolated power converter, in accordance with embodiments of the present invention. In this example, the voltage across the two power terminals of the secondary power transistor can be selected to divide the different time periods. Further, when secondary chip 21 of secondary side 20 detects that the voltage across the two power terminals of the secondary power transistor (e.g., the voltage $V_{DRAIN}$ of pin DRAIN) is between thresholds V1 and V2, this can be recorded as the first time period t1-t2, and the first type of data can be transmitted during first time period t1-t2. In this example, the first type of data may refer to data 0. When secondary chip 21 of secondary side 20 detects that the voltage across the two power terminals of the secondary power transistor (e.g., voltage $V_{DRAIN}$ at pin DRAIN) is between thresholds V2 and V3, this can be recorded as the second time period t2-t3, and the second type of data can be transmitted during the second time period t2-t3. In this example, the second type of data may refer to data 1.

Then, by turning on the secondary power transistor at least once during the first time period t1-t2 and/or the second time period t2-t3 to lower the voltage at pin DRAIN of secondary chip 21, the voltage across the primary winding Lp can be be changed due to the voltage across the secondary winding. Thus, the voltage may then be detected by sampling circuit 12 and reflected on sampling voltage $V_{SEN}$, and finally received by pin VSEN of primary chip 11, in order to pass the output reference voltage to primary chip 11. In this way, primary chip 11 can adjust the output signal of the isolated power converter by controlling the state of the primary power transistor.

For example, the change of the voltage on primary winding Lp can be detected by primary side 10 in the different time periods to identify the corresponding type of data. For example, sampling circuit 12 of primary side 10 may detect whether sampling voltage $V_{SEN}$ that represents the voltage on primary winding Lp reaches reference voltage $V_{REF}$ in the different time periods to identify the corresponding type of data, and the reference voltage $V_{REF}$ can be the value of sampling voltage $V_{SEN}$ when sampling voltage $V_{SEN}$ is at a high level. When primary chip 11 detects sampling voltage $V_{SEN}$ reaches reference voltage $V_{REF}$ during the first time period t1-t2, this can indicate the first type of data (e.g., 0) is received. When primary chip 11 detects that sampling voltage $V_{SEN}$ reaches reference voltage $V_{REF}$ during the second time period t2-t3, this can indicate the second type of data (e.g., 1) is received. Therefore, primary chip 11 may adjust the state of the primary power transistor according to the received data to realize the adjustment of the output signal of the isolated power converter.

It should be noted that there are multiple ways to realize primary chip 11 adjusting the switching state of the primary power transistor according to the type of the received data. In one embodiment, a data string (e.g., binary numbers) can be formed according to the data received in multiple cycles, and the corresponding output reference voltage can be decoded according to the relationship between the preset output reference voltage and the data string. Then, a compensation signal is generated based on the output reference voltage can control the switching state of the primary power transistor. In another embodiment, when primary chip 11 receives the first type of data, the compensation signal may be reduced. When primary chip 11 receives the second type of data, the compensation signal can be increased. Of course, the opposite logic relationship between data type and increase/decrease control is also allowed in certain embodiments. In this way, the switching state of the primary power transistor can be controlled according to the compensation signal.

Accordingly, it can be seen that when the primary power transistor and the secondary power transistor are both in the off state, the secondary power transistor can be turned on in different time periods to realize the transmission of different types of data of secondary side 20 to primary side 10 through transformer T including primary winding Lp and secondary winding Ls to control the output signal, such that the optocoupler device can be removed. Further, directly sampling the voltage on the primary winding can be adopted, and the auxiliary winding can also be removed, in order to save cost and improve space utilization of the transformer. Further, by using absorption capacitor C1 in the RCD absorption circuit to supply power to the primary chip, the power supply can be obtained without auxiliary winding.

Figure 3:
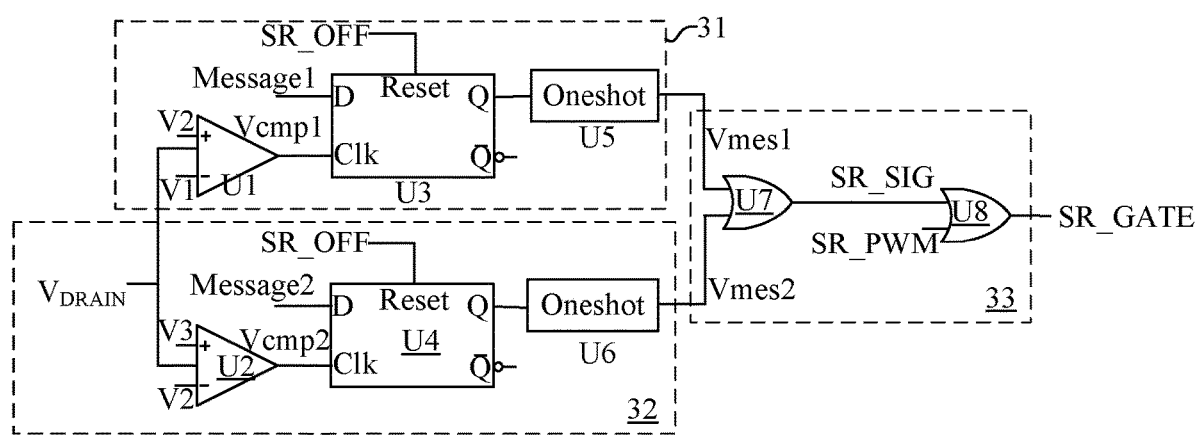
FIG. 3 is a schematic block diagram of an example control signal generation circuit for a secondary power transistor of the isolated power converter, in accordance with embodiments of the present invention.

Referring now to FIG. 3, shown is a schematic block diagram of an example control signal generation circuit for a secondary power transistor of the isolated power converter, in accordance with embodiments of the present invention. Combined with the operation waveform shown in FIG. 2, the operating process of the control signal generation circuit for the secondary power transistor will be described. The control signal generation circuit for the secondary power transistor can include detection circuit 31, detection circuit 32, and logic circuit 33. For example, detection circuit 31 can include comparison circuit U1, D flip-flop U3, and one-shot U5.

When the first type of data is to be transmitted to primary side 10, Message1 can be set to be a high level and input to D flip-flop U3 via terminal D. When comparison circuit U1 detects the voltage across the two power terminals of the secondary power transistor (e.g., when voltage $V_{DRAIN}$ at pin DRAIN of secondary chip 21 is between thresholds V1 and V2), comparison circuit U1 may generate high-level comparison signal Vcmp1. Also, comparison signal Vcmp1 can be transmitted to terminal Clk of D flip-flop U3, such that the output signal generated at terminal Q of D flip-flop U3 is set to be a high level when voltage $V_{DRAIN}$ is between thresholds V1 and V2. Then, one-shot U5 may receive the output signal of D flip-flop U3 via terminal Q, and may generate a single pulse signal with a pulse width of first time T1 according to the output signal, and the single pulse signal can be recorded as detection signal Vmes1.

Similarly, detection circuit 32 can include comparison circuit U2, D flip-flop U4, and one-shot U6. When the second type of data is to be transmitted to primary side 10, Message2 can be set to be a high level and is input to D flip-flop U4 via terminal D. When comparison circuit U2 detects that the voltage across the two power terminals of the secondary power transistor (e.g., when voltage $V_{DRAIN}$ of pin DRAIN of secondary chip 21 is between thresholds V2 and V3), comparison circuit U2 may generate a high-level comparison signal Vcmp2, and comparison signal Vcmp2 can be transmitted to terminal Clk of D flip-flop U4, such that the output signal generated at terminal Q of D flip-flop U4 is set to be a high level when voltage $V_{DRAIN}$ is between thresholds V2 and V3. Then, one-shot U6 may receive the output signal of D flip-flop U4 via terminal Q, and can generate a single pulse signal with a pulse width of first time T1 according to the output signal, and the single pulse signal may be recorded as detection signal Vmes2.

For example, logic circuit 33 can include OR-circuit U7 and OR-circuit U8. OR-circuit U7 may receive detection signals Vmes1 and Vmes2, and can generate secondary detection signal SR_SIG. OR-circuit U8 may receive secondary detection signal SR_SIG and secondary synchronous rectification signal SR_PWM (which can control the secondary power transistor to be turned on and off at normal operation), and can generate control signal SR_GATE for the secondary power transistor to control the switching state of the secondary power transistor. Accordingly, the transmission of signal 0 can be completed when Message1 is at a high level, and the transmission of signal 1 can be completed when Message2 is at a high level. It should be noted that when both Message1 and Message2 are at a low level, this can indicate that the power converter is in the normal operating state; that is, no data transmission is required.

Figure 4:
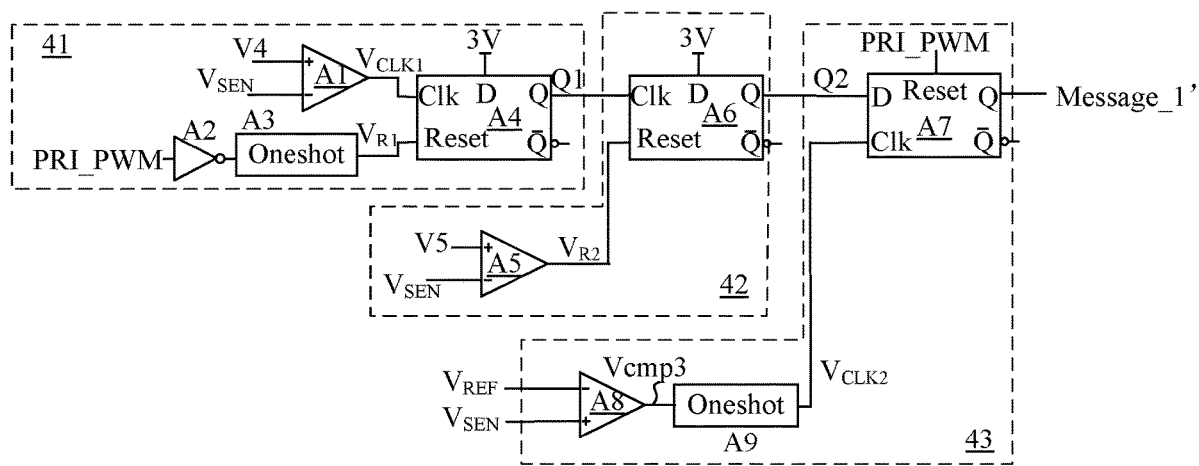
FIG. 4 is a schematic block diagram of an example first identification circuit of the isolated power converter, in accordance with embodiments of the present invention.

Referring now to FIG. 4, shown is schematic block diagram of an example first identification circuit of the isolated power converter, in accordance with embodiments of the present invention. Combined with the operation waveform shown in FIG. 2, the operating process of the first identification circuit is described. The first identification circuit can be configured in primary chip 11 to identify the type of the transmitted data according to sampling voltage $V_{SEN}$ representing the voltage on primary winding Lp. For example, the first identification circuit can include circuits 41, 42, and 43.

In this example, circuit 41 can detect start time t1 of first time period t1-t2. For example, when voltage $V_{DRAIN}$ at pin DRAIN of secondary chip 21 reaches threshold V1, sampling voltage $V_{SEN}$ representing the voltage on primary winding Lp may start to be lower than threshold V4 at this moment. According to this feature, start time t1 can be detected. For example, circuit 41 can include comparator A1, D flip-flop A4, and one-shot A3. For example, terminal D of D flip-flop A4 may receive a high level voltage (e.g., about 3V), and terminal Clk of the D flip-flop A4 may receive comparison signal $V_{CLK1}$ output by comparator A1.

Comparator A1 may receive sampling voltage $V_{SEN}$ and threshold V4, and can generate a high-level comparison signal $V_{CLK1}$ when sampling voltage $V_{SEN}$ starts to be lower than threshold V4. At this time, logic signal Q1 generated from terminal Q of D flip-flop A4 can be set at a high level.

For example, D flip-flop A4 can be reset through one-shot A3 after a preset time from the moment when control signal PRI_PWM of the primary power transistor is set at a low level. For example, circuit 41 can also include invertor A2 to receive control signal PRI_PWM, may generate an inverted signal to one-shot A3, and output signal $V_{R1}$ generated by one-shot A3 can be transmitted to terminal Reset of D flip-flop A4.

Circuit 42 can detect end time t2 of first time period t1-t2. For example, when voltage $V_{DRAIN}$ at pin DRAIN of secondary chip 21 reaches threshold V2, sampling voltage $V_{SEN}$ representing the voltage on primary winding Ls may start to be lower than threshold V5 at this moment. According to this feature, end time t2 can be detected. For example, circuit 42 can include comparator A5 and D flip-flop A6. For example, terminal D of D flip-flop A6 may receive a high level voltage (e.g., about 3V), and terminal Clk of D flip-flop A6 may receive logic signal Q1 output from D flip-flop A4. Comparator A5 may receive sampling voltage $V_{SEN}$ and threshold V5, and can generate a high-level comparison signal $V_{R2}$ when sampling voltage $V_{SEN}$ starts to be lower than threshold V5. Comparison signal $V_{R2}$ may be transmitted to terminal Reset of D flip-flop A6. At this time, logic signal Q2 generated from terminal Q of D flip-flop A6 can be set at a low level. In this way, logic signal Q2 generated by terminal Q of D flip-flop A6 can be at a high level during first period t1-t2.

Circuit 43 can detect whether sampling voltage $V_{SEN}$ has risen to reference voltage $V_{REF}$ during first time period t1-t2. For example, circuit 43 can include D flip-flop A7, comparator A8, and one-shot A9. For example, terminal D of D flip-flop A7 may receive logic signal Q2, and terminal Clk of D flip-flop A7 may receive single pulse signal $V_{CLK2}$ generated from one-shot A9. Comparator A8 may receive sampling voltage $V_{SEN}$ and reference voltage $V_{REF}$, and can generate a high-level comparison signal Vcmp3 when sampling voltage $V_{SEN}$ starts to be higher than reference voltage $V_{REF}$. Then, one-shot A9 may generate single-pulse signal $V_{CLK2}$ with a pulse width of second time T2 at this moment, such that signal Message_1' generated from terminal Q of D flip-flop A7 can be set to be a high level. Thus, primary chip 11 can be considered to receive data 0.

Figure 5:
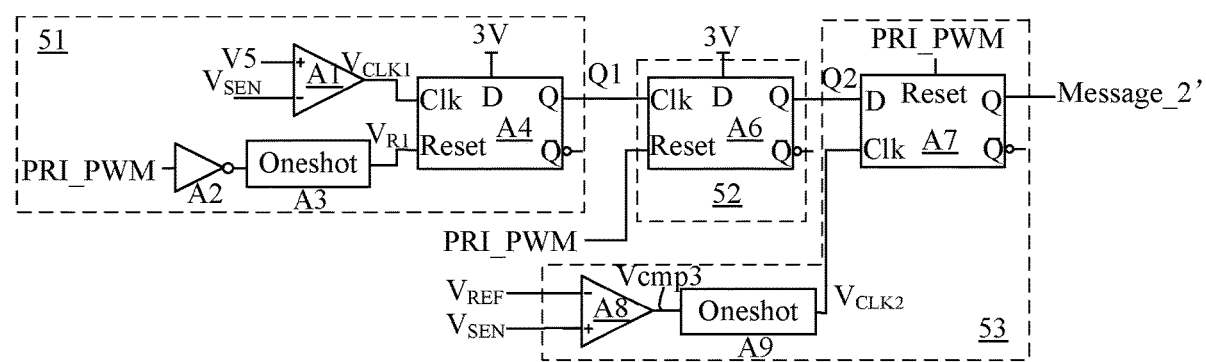
FIG. 5 is a schematic block diagram of an example second identification circuit of the isolated power converter, in accordance with embodiments of the present invention.

Referring now to FIG. 5, shown is a schematic block diagram of an example second identification circuit of the isolated power converter, in accordance with embodiments of the present invention. Combined with the operation waveform shown in FIG. 2, the operating process of the second identification circuit will be described. It should be noted that the structure and operating principle of the second identification circuit are essentially the same as those of the above-mentioned first identification circuit, with differences in the adaptive changes of some circuit parameters. The second identification circuit can also be configured in primary chip 11 to identify the type of the transmission data according to sampling voltage $V_{SEN}$ representing the voltage on primary winding Lp. For example, the second identification circuit can include circuits 51, 52, and 53.

In this example, circuit 51 can detect start time t2 of second time period t2-t3. For example, when voltage $V_{DRAIN}$ at pin DRAIN of secondary chip 21 reaches threshold V2, sampling voltage $V_{SEN}$ representing the voltage on primary winding Lp may start to be lower than threshold V5 at this moment. According to this feature, start time t2 can be detected. For example, circuit 51 can include comparator A1, D flip-flop A4, and one-shot A3. For example, terminal D of D flip-flop A4 may receive a high level voltage (e.g., about 3V), and terminal Clk pin of D flip-flop A4 may receive comparison signal $V_{CLK1}$ output from comparator A1.

Comparator A1 may receive sampling voltage $V_{SEN}$ and threshold V4, and can generate a high-level comparison signal $V_{CLK1}$ when sampling voltage $V_{SEN}$ starts to be lower than threshold V5. At this time, logic signal Q1 generated from terminal Q of D flip-flop A4 can be set at a high level. For example, D flip-flop A4 can be reset through one-shot A3 after a preset time from the moment when control signal PRI_PWM of the primary power transistor is set to be a low level. For example, circuit 51 can also include invertor A2 to receive control signal PRI_PWM, and may generate an inverted signal to one-shot A3. Also, output signal $V_{R1}$ generated by one-shot A3 can be transmitted to terminal Reset of D flip-flop A4.

Circuit 52 can detect end time t3 of second time period t2-t3. For example, when voltage $V_{DRAIN}$ of pin DRAIN of secondary chip 21 reaches threshold V3, control signal PRI_PWM of the primary power transistor can be set to be a high level. According to this feature, the end time t3 can be detected. For example, circuit 52 can include D flip-flop A6, and terminal D pin of D flip-flop A6 may receive a high level voltage (e.g., about 3V), and terminal Clk of D flip-flop A6 may receive logic signal Q1 output from D flip-flop A4. The reset pin Reset of D flip-flop A4 may receive control signal PRI_PWM of the primary power transistor. When control signal PRI_PWM of the primary power transistor goes to a high level, logic signal Q2 generated at terminal Q of D flip-flop A6 can be set to a low level. In this way, logic signal Q2 can be at a high level during second time period t2-t3.

Circuit 43 can detect whether sampling voltage $V_{SEN}$ has risen to reference voltage $V_{REF}$ during second time period t2-t3. For example, circuit 43 can include D flip-flop A7, comparator A8, and one-shot A9. For example, terminal D of D flip-flop A7 may receive logic signal Q2, and terminal Clk of D flip-flop A7 may receive single pulse signal $V_{CLK2}$ generated from one-shot A9. Comparator A8 may receive sampling voltage $V_{SEN}$ and reference voltage $V_{REF}$, and can generate high-level comparison signal Vcmp3 when sampling voltage $V_{SEN}$ starts to be higher than reference voltage $V_{REF}$. Then, one-shot A9 can generate single-pulse signal $V_{CLK2}$ with a pulse width of second time T2 at this moment, such that signal Message_2' generated from terminal Q of D flip-flop A7 can be set to a high level. In this way, primary chip 11 can be considered to receive data 1.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An isolated power converter, comprising:
   a) a primary side having a primary winding and a primary power transistor;
   b) a secondary side having a secondary winding and a secondary power transistor;
   c) a secondary control circuit configured to change a voltage across the secondary winding by turning on the secondary power transistor at different time periods during a period when both the primary power transistor and the secondary power transistor are in a turn-off state in one operation cycle, in order to change a voltage across the primary winding;

d) a primary control circuit configured to control switching states of the primary power transistor, such that an output signal of the isolated power converter matches an output demand; and e) wherein the secondary control circuit is configured to divide the different time periods by comparing a voltage across two power terminals of the secondary power transistor against a plurality of thresholds.

2. The isolated power converter of claim 1, wherein different types of data are transmitted to the primary control circuit, and wherein the data is associated with the output demand.

3. The isolated power converter of claim 2, wherein the secondary control circuit is configured to control the secondary power transistor to be turned on at least once during the different time periods and to maintain a turn-on state of the secondary power transistor for a first time, in order to change the voltage across the secondary winding.

4. The isolated power converter of claim 1, wherein:
a) a first type of data is transmitted during a first time period;
b) the first time period is a period during which the voltage across the two power terminals of the secondary power transistor is between a first threshold and a second threshold;
c) a second type of data is transmitted during a second time period; and
d) the second time period is a period during which the voltage across the two power terminals of the secondary power transistor is between the second threshold and a third threshold.

5. The isolated power converter of claim 2, wherein the primary control circuit is configured to detect the change of the voltage across the primary winding during the different time periods to identify a corresponding type of the data.

6. The isolated power converter of claim 2, wherein the primary control circuit is configured to adjust the switching state of the primary power transistor according to the type of the received data to adjust the output signal of the isolated power converter.

7. The isolated power converter of claim 5, wherein:
a) the primary control circuit is configured to detect whether the voltage across the primary winding rises to a reference voltage in the different time periods, in order to identify a corresponding type of data; and
b) the reference voltage equals to a value of a sampling voltage when the sampling voltage representing the voltage across the primary winding is at a high level.

8. The isolated power converter of claim 7, further comprising a sampling circuit configured to obtain the sampling voltage, wherein the sampling circuit is connected between two terminals of the primary winding.

9. The isolated power converter of claim 3, wherein the secondary control circuit comprises a control signal generation circuit, comprising:
a) a first detection circuit configured to generate a first detection signal to transmit the first type of data to the primary control circuit when detecting that the voltage across the two power terminals of the secondary power transistor is between the first and second thresholds, wherein the first detection signal is configured to be a single pulse signal with a pulse width of the first time;
b) a second detection circuit configured to generate a second detection signal to transmit the second type data to the primary control circuit when detecting that the voltage across the two power terminals of the secondary power transistor is between the second and third thresholds, wherein the second detection signal is configured to be a single pulse signal with a pulse width of the first time; and
c) a logic circuit configured to generate a control signal to control the switching states of secondary power transistor based on the first detection signal, the second detection signal, and a secondary synchronous rectification signal.

10. The isolated power converter of claim 7, wherein the primary control circuit comprises:
a) a first identification circuit configured to detect whether the sampling voltage rises to the reference voltage after the sampling voltage is lower than a fourth threshold, in order to identify the first type of the data; and
b) a second identification circuit configured to detect whether the sampling voltage rises to the reference voltage after the sampling voltage is lower than a fifth threshold to identify the second type of the data.

11. The isolated power converter of claim 10, wherein the sampling voltage starts to be lower than the fifth threshold after a beginning of the first time period, and the sampling voltage starts to be lower than the fourth threshold after an end of the first time period.

12. The isolated power converter of claim 1, wherein the primary control circuit and the secondary control circuit are respectively integrated in a single chip.

13. A method of data transmission applied to an isolated power converter, wherein the isolated power converter comprises a primary side having a primary winding and a primary power transistor, and a secondary side having a secondary winding and a secondary power transistor, the method comprising:
a) changing a voltage across the secondary winding to change a voltage across the primary winding by turning on the secondary power transistor at different time periods during a period when both the primary power transistor and the secondary power transistor are in a turn-off state in one operation cycle;
b) transmitting different types of data to the primary side; and
c) dividing the different time periods by comparing a voltage across two power terminals of the secondary power transistor against a plurality of thresholds.

14. The method of claim 13, further comprising maintaining a turn-on state of the secondary power transistor for a first time, so as to change the voltage across the secondary winding.

15. The method of claim 13, further comprising:
a) transmitting a first type of data during a first time period, wherein the first time period is a period during which a voltage across two power terminals of the secondary power transistor is between a first threshold and a second threshold; and
b) transmitting a second type of data during a second time period, wherein the second time period is a period during which the voltage across the two power terminals of the secondary power transistor is between the second threshold and a third threshold.

* * * * *